US011182629B2

(12) United States Patent
Martin et al.

(10) Patent No.: US 11,182,629 B2
(45) Date of Patent: Nov. 23, 2021

(54) MACHINE LEARNING BASED DRIVER ASSISTANCE

(71) Applicant: The Regents of the University of California, Oakland, CA (US)

(72) Inventors: Sujitha Martin, Mira Loma, CA (US); Kevan Yuen, San Diego, CA (US); Mohan M. Trivedi, San Diego, CA (US)

(73) Assignee: The Regents of the University of California, Oakland, CA (US)

( * ) Notice: Subject to any disclaimer, the term of this patent is extended or adjusted under 35 U.S.C. 154(b) by 67 days.

(21) Appl. No.: 16/481,822

(22) PCT Filed: Jan. 31, 2018

(86) PCT No.: PCT/US2018/016143
§ 371 (c)(1),
(2) Date: Jul. 29, 2019

(87) PCT Pub. No.: WO2018/144537
PCT Pub. Date: Aug. 9, 2018

(65) Prior Publication Data
US 2020/0005060 A1 Jan. 2, 2020

Related U.S. Application Data

(60) Provisional application No. 62/452,850, filed on Jan. 31, 2017.

(51) Int. Cl.
*G06K 9/00* (2006.01)
*G05D 1/00* (2006.01)
(Continued)

(52) U.S. Cl.
CPC ....... *G06K 9/00845* (2013.01); *G05D 1/0061* (2013.01); *G05D 1/0223* (2013.01);
(Continued)

(58) Field of Classification Search
CPC .............. G05D 1/0061; G05D 1/0223; G05D 2201/0213; G06K 9/00845; G06K 9/00228; G06K 9/00617; G06K 9/6256
See application file for complete search history.

(56) References Cited

U.S. PATENT DOCUMENTS 9,405,982 B2 * 8/2016 Zhang ................ G06K 9/00845
9,547,798 B2 * 1/2017 Plummer ........... G06K 9/00845
(Continued)

OTHER PUBLICATIONS

Birrell, S. A. et al., "Glance behaviours when using an in-vehicle smart driving aid: A real-world, on-road driving study," Transportation Research Part F 22 (2014), pp. 113-125.
(Continued)

*Primary Examiner* — Gregory M Desire
(74) *Attorney, Agent, or Firm* — Mintz Levin Cohn Ferris Glovsky and Popeo, P.C.

(57) ABSTRACT

A method for machine learning based driver assistance is provided. The method may include detecting, in one or more images of a driver operating an automobile, one or more facial landmarks. The detection of the one or more facial landmarks may include applying, to the one or more images, a first machine learning model. A gaze dynamics of the driver may be determined based at least on the one or more facial landmarks. The gaze dynamics of the driver may include a change in a gaze zone of the driver from a first gaze zone to a second gaze zone. A state of the driver may be determined based at least on the gaze dynamics of the driver. An operation of the automobile may be controlled based at least on the state of the driver. Related systems and articles of manufacture, including computer program products, are also provided.

20 Claims, 7 Drawing Sheets

(51) Int. Cl.
    *G05D 1/02*     (2020.01)
    *G06K 9/62*     (2006.01)

(52) U.S. Cl.
    CPC ..... *G06K 9/00228* (2013.01); *G06K 9/00617* (2013.01); *G06K 9/6256* (2013.01); *G05D 2201/0213* (2013.01)

(56) References Cited

U.S. PATENT DOCUMENTS

| | | | |
|---|---|---|---|
| 9,751,534 B2* | 9/2017 | Fung | G16H 50/20 |
| 2011/0121976 A1 | 5/2011 | Johns et al. | |
| 2014/0168399 A1 | 6/2014 | Plummer et al. | |
| 2014/0204193 A1 | 7/2014 | Zhang et al. | |
| 2014/0354684 A1* | 12/2014 | Beckwith | G06K 9/00671 |
| | | | 345/633 |
| 2016/0202757 A1 | 7/2016 | Miao et al. | |
| 2017/0200449 A1* | 7/2017 | Penilla | G10L 15/063 |
| 2020/0005060 A1* | 1/2020 | Martin | G05D 1/0223 |

OTHER PUBLICATIONS

Fridman, L. et al., "Owl and lizard: Patterns of head pose and eye pose in driver gaze classification," IET Computer Vision, 2016, vol. 10, Issue 4, pp. 308-314.

Ghiasi, G. et al., "Occlusion Coherence: Detecting and Localing Occluded Faces," Computer Vision and Image Understanding, Aug. 26, 2016. 14 pages.

Li, N. et al., "Detecting drivers' mirror-checking actions and its application to maneuver and secondary task recognition," IEEE Transactions on Intelligent Transportation Systems, 2016.

Martin, S. et al., "Vision for Intelligent Vehicles and Applications (VIVA): Face Detection and Head Pose Challenge," IEEE Intelligent Vehicles Symposium, 2016.

* cited by examiner

MACHINE LEARNING BASED DRIVER ASSISTANCE

RELATED APPLICATION

This application is a national phase entry of Patent Cooperation Treaty Application No. PCT/US2018/016143 filed Jan. 31, 2018, entitled "MACHINE LEARNING BASED DRIVER ASSISTANCE," which claims the benefit of priority to U.S. Provisional Application No. 62/452,850 entitled "ROBUST FACE DETECTION, POSE-GAZE ZONE ESTIMATION AND DRIVER BEHAVIOR ANALYSIS SYSTEM," filed on Jan. 31, 2017, the disclosures of which are incorporated herein by reference in their entirety.

TECHNICAL FIELD

The presently described subject matter relates generally to machine learning and more specifically to machine learning based driver assistance.

BACKGROUND

A driver assistance system may be configured to automate at least some of the manual controls required to operate an automobile including, for example, steering, breaking, acceleration, deceleration, and/or the like. Although a driver assistance system may not replace human drivers, an automobile equipped with a driver assistance system may nevertheless be able to operate with minimal input from a human driver. For example, the driver assistance system may be able to navigate the automobile through traffic including execute lane changes all while keeping the automobile centered within a chosen lane. Furthermore, the drive assistance system may be able alert a human driver to road hazards that elude the human driver including, for example, blind spots, lane departure, and/or the like.

SUMMARY

Systems, methods, and articles of manufacture, including computer program products, are provided for machine learning based driver assistance. In some example embodiments, there is provided a system that includes at least one processor and at least one memory. The at least one memory may include program code that provides operations when executed by the at least one processor. The operations may include: detecting, in one or more images of a driver operating an automobile, one or more facial landmarks, the detection of the one or more facial landmarks comprising applying, to the one or more images, a first machine learning model; determining, based at least on the one or more facial landmarks, a gaze dynamics of the driver, the gaze dynamics of the driver comprising a change in a gaze zone of the driver from a first gaze zone to a second gaze zone; determining, based at least on the gaze dynamics of the driver, a state of the driver; and controlling, based at least on the state of the driver, an operation of the automobile.

In some variations, one or more features disclosed herein including the following features can optionally be included in any feasible combination. The one or more facial landmarks may include a pupil, an iris, and/or an eyelid.

In some variations, the first machine learning model may be trained based on training data. The training data may include a plurality of images that includes and/or excludes the one or more facial landmarks. The first machine learning model may be trained to detect the one or more facial landmarks in the plurality of images.

In some variations, a face may be detected in the one or more images of the driver operating the automobile. The detection of the face may include applying, to the one or more images, a second machine learning model. The second machine learning model may be trained based on training data. The training data may include a plurality of images that includes and/or excludes the face. The second machine learning model may be trained to detect the face in the plurality of images.

In some variations, the first gaze zone and/or the second gaze zone may be different areas at which the driver looks while operating the automobile. The first gaze zone and/or the second gaze zone may correspond to a left side mirror of the automobile, a right side mirror of the automobile, a rear view mirror of the automobile, an instrument cluster of the automobile, a center console of the automobile, a first portion of a windshield directly in front of the driver, a second portion of the windshield to a right of the driver, and/or a driver side window.

In some variations, the determination of the state of the driver may include comparing the gaze dynamics of the driver to at least one gaze model associated with a maneuver. The at least one gaze model may include gaze zones observed in drivers performing the maneuver. The at least one gaze model may include a Gaussian distribution of the gaze zones observed in drivers performing the maneuver. The at least one gaze model may include gaze zones observed in drivers before an execution of the maneuver, during the execution of the maneuver, and/or after the execution of the maneuver.

In some variations, the first gaze zone and/or the second gaze zone may correspond to one or more eyes of the driver being closed and/or cast downward. The state of the driver may include that the driver is inattentive.

In some variations, the first machine learning model may include a neural network, a regression model, an instance-based model, a regularization model, a decision tree, a Bayesian model, a clustering model, an associative model, a deep learning model, a dimensionality reduction model, and/or an ensemble model. The first machine learning model may be configured to output a heat map comprising a first location having a first color and a second location having a second color. The first location and the second location may include different portions of the one or more images. The first color may correspond to a first probability of the one or more facial landmarks being present at the first location. The second color may correspond to a second probability of the one or more facial landmarks being present at the second location.

In some variations, the control of the operation of the automobile may include steering, acceleration, deceleration, and/or braking.

In some variations, a head pose of the driver may be determined based at least on the one or more images of the driver. The head pose of the driver may include a position and/or an orientation of a head of the driver. The gaze dynamics of the driver may be further determined based at least on the head pose of the driver.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes, it should be readily understood that such features are not intended to be limiting. The claims that follow this disclosure are intended to define the scope of the protected subject matter.

DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers may denote similar structures, features, and/or elements.

DETAILED DESCRIPTION

Figure 1:
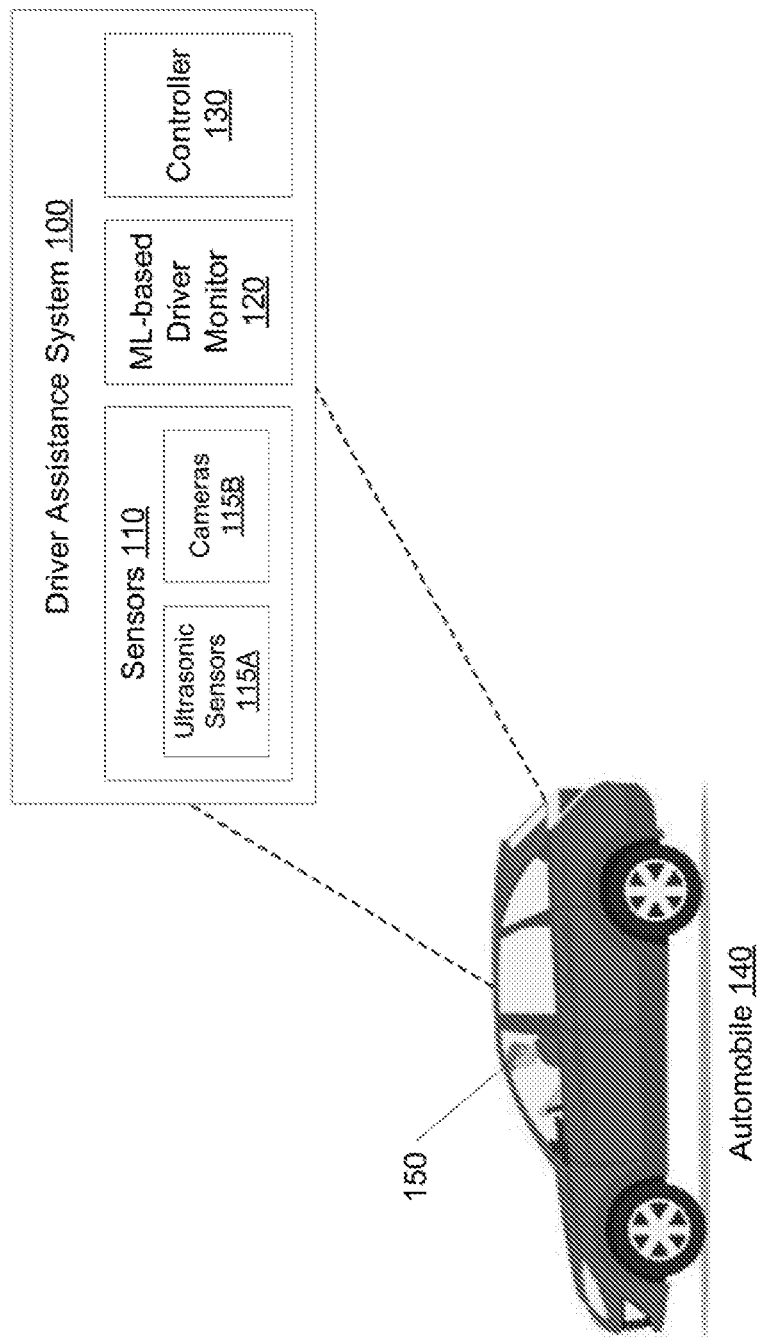
FIG. 1 depicts a system diagram illustrating a driver assistance system, in accordance with some example embodiments.

While a driver assistance system may automate at least some manual controls over an automobile (e.g., steering, breaking, acceleration, deceleration, and/or the like), the proper operation of the automobile may nevertheless require input from a human driver. In this semi-autonomous driving mode, the driver assistance system may share control over the automobile with the human driver. For example, the human driver may be required to detect road conditions that may incapacitate the driver assistance system (e.g., obscure lane markings) and assume at least partial control over the operation of the automobile under those circumstances. But despite sharing control over an automobile with a human driver, conventional driver assistance systems tend to be agnostic to the state of the human driver. Instead, conventional driver assistance systems may rely solely on data tracking the location of the automobile (e.g., global positioning system (GPS) data) and surrounding objects (e.g., other automobiles, pedestrians, and/or the like). As such, a conventional driver assistance system may be unable to recognize and correct for hazards posed by the driver including, for example, inattention, sudden actions, and/or the like.

In some example embodiments, a driver assistance system may be configured to monitor the state of a driver based at least on one or more images of the driver. The driver assistance system may include one or more machine learning models. These machine learning models may be trained to analyze the one or more images of the driver and identify landmarks on a face of the driver including, for example, pupil, iris, eyelid, and/or the like. According to some example embodiments, the driver assistance system may determine, based at least on the position of the facial landmarks, the state of the driver. For example, the driver assistance system may assess driver alertness based on vertical position of the eyelid of the driver. Alternatively and/or additionally, the horizontal position of the pupil and/or the iris of the driver may be predictive of future actions including, for example, a left lane change, a right lane change, and/or the like.

The driver assistance system may automate at least some of the manual controls required to operate an automobile including, for example, steering, breaking, acceleration, deceleration, and/or the like. According to some example embodiments, the driver assistance system may control the operation of the automobile based on the state of the driver instead of and/or in addition to data tracking the location of the automobile (e.g., global positioning system (GPS) data) and surrounding objects (e.g., other automobiles, pedestrians, and/or the like). For instance, the driver assistance system may alert the driver and/or assume control of the automobile when the driver assistance system determines that the driver is inattentive. Alternatively and/or additionally, when the driver assistance system determines that the driver is about to perform an action, the driver assistance system may maneuver the automobile in anticipation of that future action. For example, if the driver assistance system determines that the driver is about to perform a lane change, the driver assistance system may navigate the automobile around other automobiles in the desired lane through steering, breaking, accelerating, declaration, and/or the like.

FIG. 1 depicts a system diagram illustrating a driver assistance system 100, in accordance with some example embodiments. Referring to FIG. 1, the driver assistance system 100 may be deployed at an automobile 140. In some example embodiments, the driver assistance system 100 may support semi-autonomous driving. As such, control over the operations of the automobile 140 may be shared between the driver assistance system 100 and a driver 150 of the automobile 140. For example, the driver assistance system 100 may have at least partial control over the operations of the automobile 140 including, for example, steering, breaking, acceleration, deceleration, and/or the like. Meanwhile, the automobile 140 may also respond to inputs from the driver 150.

Referring again to FIG. 1, the driver assistance system 100 may include a plurality of sensors 110 configured to detect objects and/or events both inside and outside of the automobile 140. As shown in FIG. 1, the plurality of sensors 110 may include one or more ultrasonic sensors 115A, which may be any type of sound-based sensor including, for example, a radar, a sonar, a lidar, and/or the like. Alternatively and/or additionally, the plurality of sensors 110 may also include one or more cameras 115B, which may be any type of light-based sensor including, for example, a video camera, a still camera, an infrared camera, and/or the like. According to some example embodiments, at least one of the cameras 115B may be deployed within the cabin of the automobile 140 and configured to capture images of the driver 150, for example, while the driver 150 is operating the automobile 140.

In some example embodiments, the driver assistance system 100 may be configured to monitor the state of the driver 150 operating the automobile 140. For example, as shown in FIG. 1, the driver assistance system 100 may include a machine learning based driver monitor 120, which may be configured to determine, based at least on the images of the driver 150 captured by the cameras 115B, a state of the driver 150. According to some example embodiments, the machine learning based driver monitor 120 may analyze one or more image in order to identify landmarks on the face of the driver 150 including, for example, pupil, iris, eyelid, and/or the like. Furthermore, the state of the driver 150 operating the automobile 140 may be determined based at least on a position of the facial landmarks. For instance, the machine learning based driver monitor 120 may assess driver alertness based on the vertical position of the eyelid of the driver 150. Alternatively and/or additionally, the machine learning based driver monitor 120 may predict, based at least on horizontal movement in the pupil and/or the iris of the driver 150, one or more future actions including, for example, a left lane change, a right lane change, and/or the like.

Referring again to FIG. 1, the driver assistance system 100 may further include a controller 130 configured to control the operations of the automobile 140, for example, by at least interfacing with one or more mechanical components of the automobile 140 including, for example, engine, brakes, transmission, and/or the like. As noted, the driver assistance system 100 may have at least partial control over the operations of the automobile 140 including, for example, steering, breaking, acceleration, deceleration, and/or the like. In some example embodiments, the controller 130 may control the operation of the automobile 140 (e.g., steer, break, accelerate, decelerate, and/or the like) based on the state of the driver 150 as determined by the machine learning driver monitor 120. Alternatively and/or additionally, the controller 130 may also control the operations of the automobile 140 based on other objects and/or events detected by the plurality of sensors 110 from both inside the automobile 140 and outside of the automobile 140. For instance, the controller 130 may generate an alert and/or assume control of the automobile 140 when the machine learning based driver monitor 120 determines that the driver 150 of the automobile 140 is inattentive. Alternatively and/or additionally, when the machine learning based driver monitor 120 determines that the driver is about to perform an action, the controller 130 may maneuver the automobile 140 in based on that future action as well as the events and/or objects detected outside of the automobile 140. For example, the controller 130 may, in anticipation of and/or in preparation for a lane change by the driver 150, maneuver the automobile 140 to avoid other automobiles in the desired lane.

Figure 2:
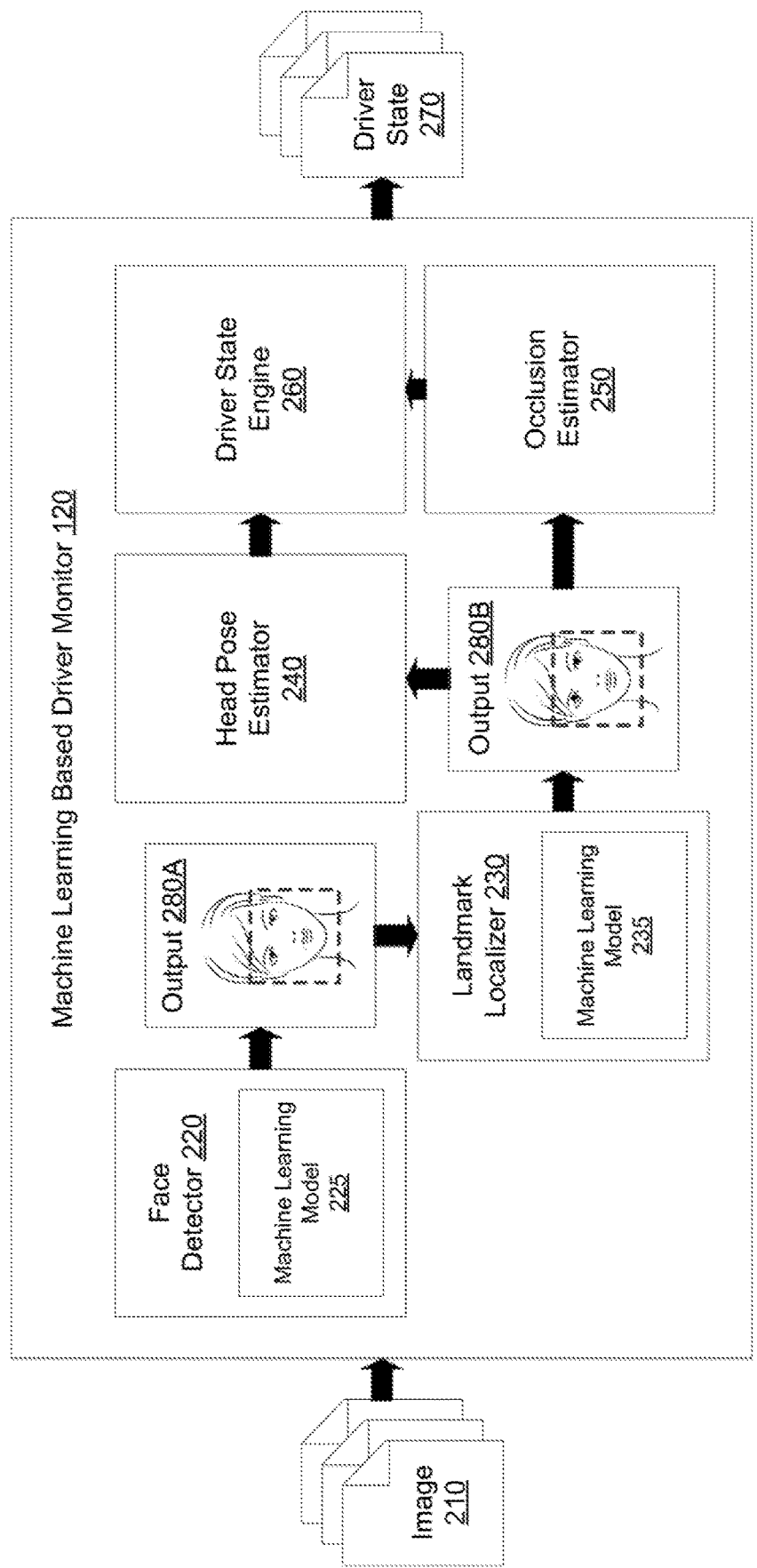
FIG. 2 depicts a block diagram illustrating a machine learning based driver monitor, in accordance with some example embodiments.

FIG. 2 depicts a block diagram illustrating the machine learning based driver monitor 120, in accordance with some example embodiments. Referring to FIGS. 1-2, the machine learning based driver monitor 120 may include a face detector 220, a landmark localizer 230, a head pose estimator 240, an occlusion estimator 250, and a driver state engine 260. It should be appreciated that the machine learning based driver monitor 120 may include additional and/or different components than shown.

Referring again to FIG. 2, the machine learning based driver monitor 120 may be configured to receive a plurality of images including, for example, an image 210. These images may be captured by one or more of the sensors 110 including, for example, the cameras 115B. In some example embodiments, the machine learning based driver monitor 120 may be configured to analyze the image 210. For example, the machine learning based driver monitor 120 may analyze the image 210 to detect the face of the driver 150 operating the automobile 140. Alternatively and/or additionally, the machine learning based driver monitor 120 may further analyze the image 210 to detect one or more landmarks in the face of the driver 150 including, for example, an iris, a pupil, an eyelid, and/or the like. According to some example embodiments, the machine learning based driver monitor 120 may determine a driver state 270 of the driver 150 based at least on a position and/or a movement of these facial landmarks. For example, the driver state 270 may include an assessment of an alertness of the driver 150 and/or one or more future actions of the driver 150. As noted, the controller 130 may control the operations of the automobile 140 based at least on the driver state 270 determined by the machine learning based driver monitor 120.

In some example embodiments, as shown in FIG. 2, the machine learning based driver monitor 120 may include the face detector 220. The face detector 220 may include one or more machine learning models including, for example, a first machine learning model 225, which may be trained to detect a face of the driver 150 in the image 210. The first machine learning model 225 may be any type of machine learning model. For example, the first machine learning model 225 may be a neural network including, for example, a convolutional neural network, an autoencoder, a probabilistic neural network, a time delay neural network, a recurrent neural network, and/or the like. Alternatively and/or additionally, the first machine learning model 225 may be implemented as a stacked hourglass network that includes a succession of pooling layers and deconvolution layers. However, it should be appreciated that the face detector 220 may include different and/or additional machine learning models including, for example, regression models, instance-based models, regularization models, decision trees, Bayesian models, clustering models, associative models, deep learning models, dimensionality reduction models, ensemble models, and/or the like.

As noted, the first machine learning model 225 may be trained to detect the face of the driver 150 in the image 210. For example, as shown in FIG. 2, the first machine learning model 225 may generate, based at least on a processing of the image 210, a first output 280A that includes a visual indication (e.g., a box and/or the like) of where the face of the driver 150 is located in the image 210. Where the first machine learning model 225 is implemented as a stacked hourglass network, the first output 280A may be a heat map that indicates, using different colors, the probability of a face being present in different areas across the image 210. In some example embodiments, the first machine learning model 225 may be trained based on training data that includes a plurality of images that are known to include a human face and/or a plurality of images that are known to not include a human face. Training the first machine learning model 225 may include adjusting the weights and/or biases applied by the first machine learning model 225 to minimize an error in the detection of human faces when the first machine learning model 225 encounters images that includes and/or excludes a human face.

In some example embodiments, the first machine learning model 225 may be trained based on an augmented set of training data that includes images of human faces under a variety of conditions. The augmented set of training data may include images in which faces are subject to a variety of different lighting conditions including lighting conditions that may obscure the face. For example, the augmented set of training data may include at least some images captured under excessively bright and/or excessively dark lighting conditions. Alternatively and/or additionally, the augmented set of training data may also include images in which the faces are subject to occlusions due to other objects and/or head pose. As used herein, head pose may refer to a position and/or an orientation of the head including, for example, the pitch of the head, the yaw of the head, the roll of the head, and/or the like.

For example, the augmented set of training data may include at least some images in which the face is at least partially covered by an object (e.g., a hand, sunglasses, a drink container, and/or the like). The augmented set of training data may also include at least some images in which the face is at least partially obscured by head pose including, for example, an upturned head pose, a downturned head pose, a sideways head pose, and/or the like. Training the first machine learning model 225 based on an augmented set of training data may enhance the ability of the first machine learning model 225 to detect the face of the driver 150 even when the image 210 is suboptimal (e.g., captured under poor lighting conditions, includes occlusions, and/or the like).

Referring again to FIG. 2, the machine learning based driver monitor 120 may include the landmark localizer 230, which may be configured to identify one or more landmarks in the face of the driver 150 operating the automobile 140. For instance, as shown in FIG. 2, the landmark localizer 230 may include a second machine learning model 235, which may be trained to detect, based at least on the first output 280A from the face detector 220, one or more facial landmarks including, for example, an eyelid, an iris, a pupil, and/or the like. In doing so, the landmark localizer 230 may generate a second output 280B that includes one or more visual indications of where the facial landmarks of the driver 150 are located in the image 210. For example, the second output 280B may include dots marking the locations of the facial landmarks. Alternatively and/or additionally, the second output 280B may be a heat map having different colors that correspond to the varying likelihood of a facial landmark being found at locations across the image 210. In some example embodiments, the landmark localizer 230 may determine that a facial landmark (e.g., an iris, a pupil, an eyelid, and/or the like) is occluded if the second machine learning model 235 is unable to detect that facial landmark in the image 210.

In some example embodiments, the second machine learning model 235 may also be a neural network including, for example, a convolutional neural network, an autoencoder, a probabilistic neural network, a time delay neural network, a recurrent neural network, and/or the like. Alternatively and/or additionally, the second machine learning model 235 may be implemented as a stacked hourglass network that includes a succession of pooling layers and deconvolution layers. As noted, the stacked hourglass network may be capable of generating, for the second output 280, a heat map that shows the likelihood of a facial landmark being found at various locations across an image. However, it should be appreciated that the landmark localizer 230 may include different and/or additional machine learning models including, for example, regression models, instance-based models, regularization models, decision trees, Bayesian models, clustering models, associative models, deep learning models, dimensionality reduction models, ensemble models, and/or the like. Furthermore, the second machine learning model 235 may also be trained based on an augmented set of training data that includes suboptimal images in which facial landmarks may be obscured, for example, by poor lighting, physical objects, head pose, and/or the like.

Referring again to FIG. 2, the machine learning based driver monitor 120 may include the head pose estimator 240. The head pose estimator 240 may be configured to determine, based at least on the second output 280B from the landmark localizer 230, a head pose of the driver 150 in the image 210. As noted, the second output 280 may include indications (e.g., dots, heat map, and/or the like) of the location of the face of the driver 150 and/or one or more facial landmarks of the driver 150 (e.g., eyelid, iris, pupil, and/or the like). Meanwhile, the head pose of the driver 150 may correspond to the position and/or the orientation of the head of the driver 150. For instance, the head pose of the driver 150 may include, for example, the yaw of the head, the pitch of the head, the roll of the head, and/or the like. In some example embodiments, the head pose estimator 240 may apply any technique to determine the head pose of the driver 150. For example, the head pose of the driver 150 may be determined by at least applying, to the second output 280B including the indications of the location of the face of the driver 150 and/or the facial landmarks of the driver 150, one or more active appearance models (AAMs), a pose from orthography and scaling with iterations (POSIT), and/or the like.

Figure 3A:
FIG. 3A depicts an output from face detection, landmark localization, and/or pose estimation, in accordance with some example embodiments.

To further illustrate, FIG. 3A depicts examples of an output from face detection, landmark localization, and/or pose estimation, in accordance with some example embodiments. Referring to FIG. 3A, the output from the face detector 220 (e.g., the first output 280A) may include a visual indication for the location of the face of a driver. For example, as shown in FIG. 3A, the face of the driver may be demarcated by a box. Meanwhile, the output from the landmark localizer 230 (e.g., the second output 280B) may include visual indications for the locations of facial landmarks of a driver including, for example, irises, pupils, eyelids, and/or the like. For instance, as shown in FIG. 3A, the facial landmarks of the driver may be demarcated by dots. Alternatively and/or additionally, the output from the head pose estimator 240 may include a visual indication of the head pose of a driver. As shown in FIG. 3A, the head pose of a driver may be denoted by vectors that extend from the front, top, left, and/or right of the head of the driver. The position and/or orientation of the head of the driver may be expressed in terms of the length of these vectors. That is, the length of the vectors shown in FIG. 3A may correspond to the degree of yaw, pitch, and/or roll associated with various head poses.

In some example embodiments, the occlusion estimator 250 may be configured to identify, based on the second output 280B from the landmark localizer 230 and/or the head pose of the driver 150 determined by the head pose estimator 240, facial landmarks that are occluded in the image 210 due to, for example, poor lighting, physical obstacles, head pose, and/or the like. The occlusion estimator 250 may also determine the extent to which the face and/or the facial landmarks of the driver 150 in the image 210 are subject to occlusion. It should be appreciated that the facial landmarks that are occluded in the image 210 and/or the extent of occlusion may determine the driver state engine 260 may use the image 210 to determine the driver state 270. For example, the driver state engine 260 may be unable to use the image 210 if the occlusion estimator 250 determines that the occluded proportion of the face of the driver 150 and/or the facial landmarks of the driver 150 exceeds a threshold value (e.g., 50% and/or a different value). Alternatively and/or additionally, the driver state engine 260 may be unable to use the image 210 if the occlusion estimator 250 determines that certain facial landmarks of the driver 150 are occluded. For instance, the driver state engine 260 may be unable to assess driver alertness and/or predict future actions if the pupil, iris, and/or eyelid of the driver 150 are occluded. As such, according to some example embodiments, the occlusion estimator 250 may reject the image 210 if the image 210 exhibits excessive occlusion and/or the occlusion of certain facial landmarks (e.g., pupil, iris, eyelid, and/or the like).

As noted, the machine learning based driver monitor 120 may determine, based at least on the image 210, the driver state 270 of the driver 150 operating the automobile 140. Accordingly, in some example embodiment, the machine learning based driver monitor 120 may include the driver state engine 260, which may be configured to determine the driver state 270 based at least on the second output 280B from the landmark localizer 230 and/or the head pose of the driver 150 determined by the head pose estimator 240. The second output 280B may indicate the position of one or more facial landmarks of the driver 150 including, for example, an iris, a pupil, an eyelid, and/or the like. Meanwhile, the head pose estimator 240 may determine, based at leaset on the second output 280B, the head pose of the driver 150.

In some example embodiments, the driver state engine 260 may determine the driver state 270 by at least determining, based on the second output 280B and/or the head pose of the driver 150, a gaze zone for the driver 150. As used herein, the gaze zone of the driver 150 may correspond to an area the driver 150 may look towards while operating the automobile 140. For example, the gaze zone of the driver 150 may include, for example, far left, left side mirror, front, instrument cluster, rear view mirror, center counsel, right, right side mirror, and/or the like. Alternatively and/or additionally, the gaze zone of the driver 150 may include an eyes closed and/or eyes down gaze zone, which may correspond to an alertness of the driver 150. For example, the driver state engine 260 may determine, based at least on the position of the eyelid of the driver 150, that the eyes of the driver 150 are closed and/or looking down. For example, the driver state engine 250 may determine that the driver 150 is alert if the distance between a lower eyelid and an upper eyelid of the driver 150 exceeds a threshold value. Alternatively and/or additionally, the driver state engine 260 may detect fatigue and/or drowsiness if the distance between the lower eyelid and the upper eyelid of the driver 150 does not exceed the threshold value.

Figure 3B:
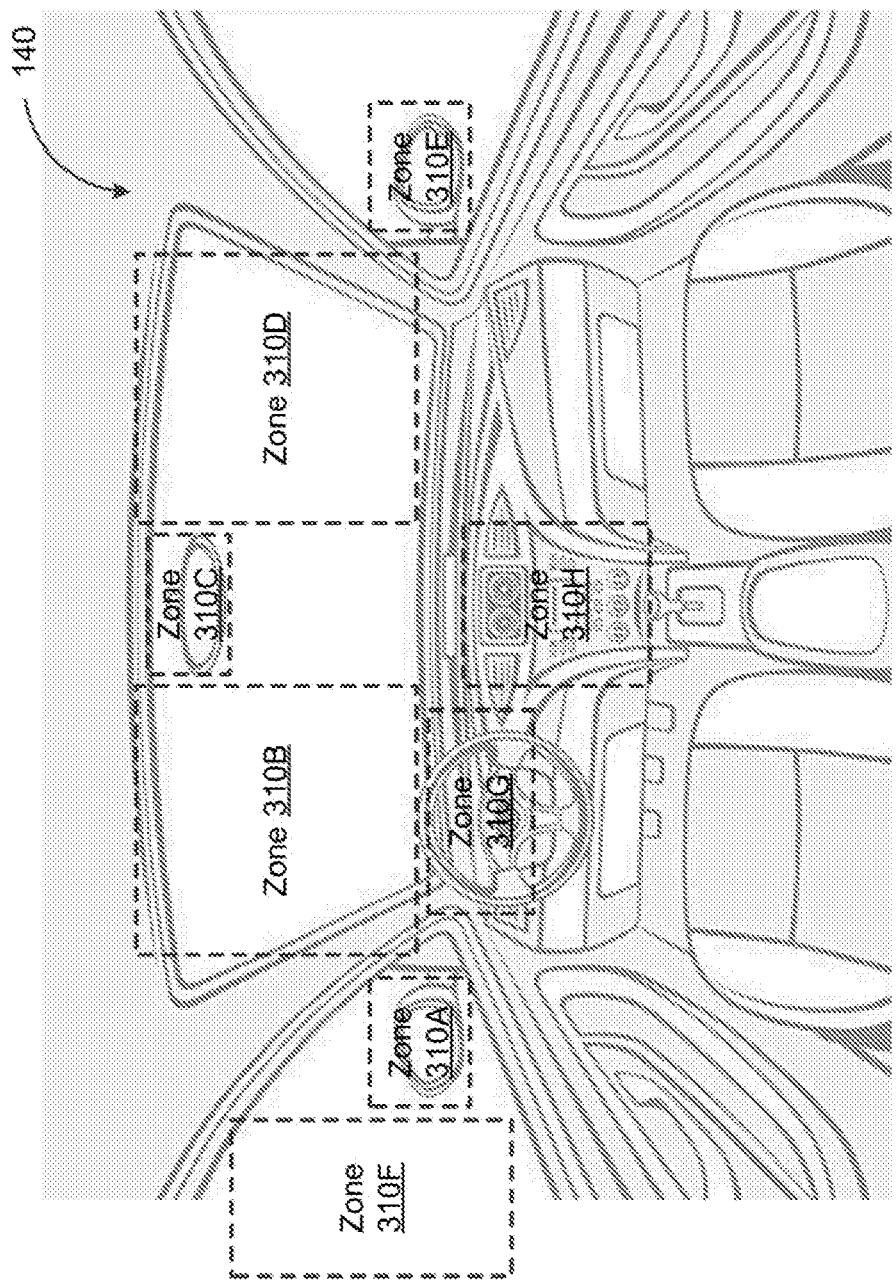
FIG. 3B depicts a plurality of gaze zones, in accordance with some example embodiments.

To further illustrate, FIG. 3B depicts a plurality of gaze zones including, for example, a first gaze zone 310A, a second gaze zone 310B, a third gaze zone 310C, a fourth gaze zone 310D, a fifth gaze zone 310E, a sixth gaze zone 310F, a seventh gaze zone 310G, an eighth gaze zone 310H, and/or the like. As shown in FIG. 3B, the first gaze zone 310A, the second gaze zone 310B, the third gaze zone 310C, the fourth gaze zone 310D, the fifth gaze zone 310E, the sixth gaze zone 310F, the seventh gaze zone 310G, and the eighth gaze zone 310H may each correspond to an area the driver 150 may look towards while operating the vehicle 140.

For example, as shown in FIG. 3B, the first zone 310A may correspond to a left side mirror of the automobile 140. As such, when the gaze zone of the driver 150 is determined to be the first zone 310A, the driver 150 may be looking toward the left side mirror of the automobile. Meanwhile, the third zone 310C may correspond to a rear view mirror of the automobile 140 and the fifth gaze zone 310E may correspond to the right side mirror of the automobile 140. The second zone 310B may correspond to a portion of the windshield of the automobile 140 directly in front of the driver 150, the fourth zone 310D may correspond to a portion of the windshield of the automobile 140 to the right of the driver 150, and the sixth zone 310F may correspond to the driver side window of the automobile 140. Alternatively and/or additionally, the seventh zone 310G may correspond to an instrument cluster of the automobile 140 and the eighth zone 310H may correspond to a center console of the automobile 140. Although not shown, it should be appreciated that the plurality of gaze zones may further include additional gaze zones for when the driver 150 is looking down and/or have closed eyes. Moreover, the driver state engine 150 may use a different set of gaze zones than shown in FIG. 3B when determining the driver state 270.

In some example embodiments, the driver state engine 360 may determine, based on the gaze zone of the driver 150, the driver state 270. For example, as noted, the driver state engine 360 may determine that the driver 150 is inattentive if the gaze zone of the driver 150 indicates that the driver 150 is looking down and/or have closed eyes. Alternatively and/or additionally, the driver state engine 360 may also determine the driver state 270 based on the gaze dynamics of the driver 150. As used herein, gaze dynamics may refer to changes in the gaze zone of the driver 150 and/or the frequency of the changes in the gaze zone of the driver 150, as may be observed in different images of the driver 150 taken over a period of time. Here, the driver state engine 360 may predict a future action of the driver 150 based on the gaze dynamics of the drive 150. For example, the gaze dynamics of the driver 150 may be compared to gaze models associated with different maneuvers including, for example, a left change, a right lane change, interaction with mobile devices (e.g., texting on mobile phones), interaction with the instrument cluster, and/or the like. The gaze model of a maneuver may include a distribution (e.g., Gaussian distribution and/or the like) of the different gaze zones observed in drivers executing the maneuver including for example, the gaze zones of the drivers before executing the maneuver, the gaze zones of the drivers while executing the maneuver, the gaze zones of the drivers after executing the maneuver, and/or the like.

Figure 3C:
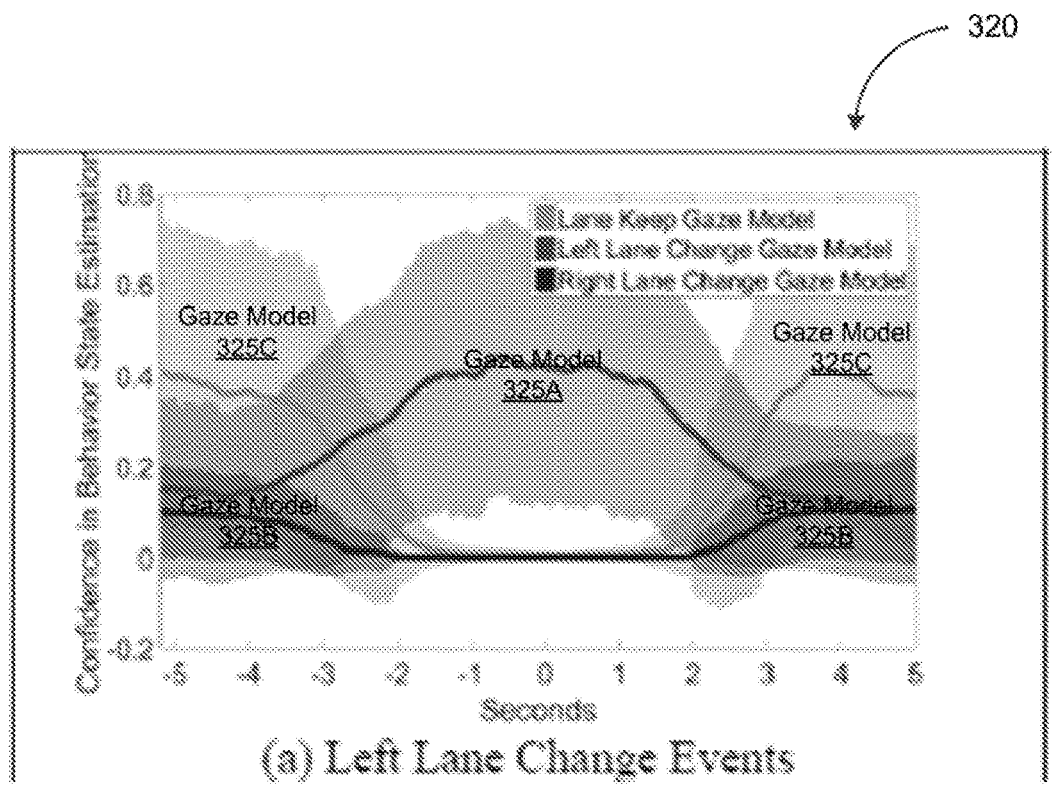
FIG. 3C depicts a graph illustrating gaze models that express the relationship between gaze dynamics and driver behavior, in accordance with some example embodiments.
Figure 3D:
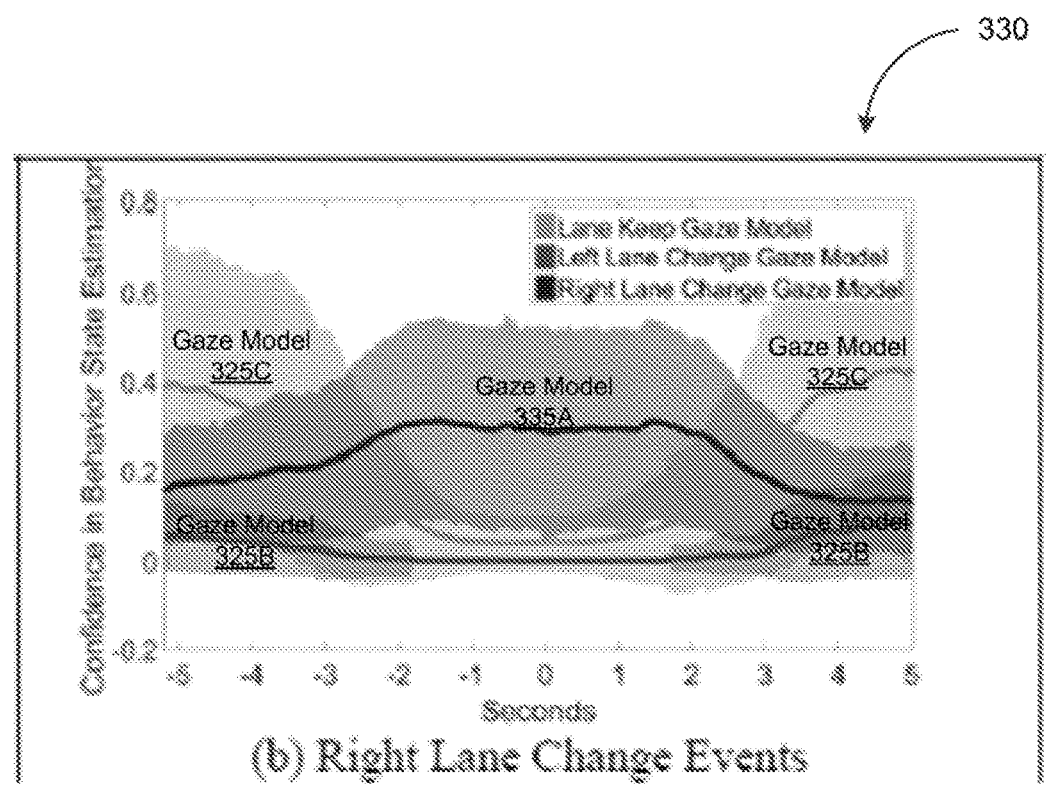
FIG. 3D depicts a graph illustrating gaze models that express the relationship between gaze dynamics and driver behavior, in accordance with some example embodiments.

To further illustrate, FIGS. 3C-D depicts graphs illustrating gaze models that express the relationship between gaze dynamics and driver behavior. For instance, FIG. 3C depicts a graph 320 illustrating a first gaze model 325A associated with a left lane change, a second gaze model 325B associated with a right lane change, and a third gaze model 325C associated with staying in the same lane. As noted, the gaze dynamics of the driver 150 may include changes in the gaze zones of the driver 150, the frequency of the changes in the gaze zone of the driver 150, and/or the like. In order to predict a future action of the driver 150, the driver state engine 360 may compare the gaze dynamics of the driver 150 to a plurality of gaze models associated with different maneuvers including, for example, the first gaze model 325A associated with a left lane change, the second gaze model 325B associated with a right lane change, the third gaze model 325C associated with staying in the same lane, and/or the like. Here, the driver state engine 360 may determine that the driver 150 is about to perform a left lane change if the gaze dynamics of the driver 150 corresponds to the first gaze model 325A associated with a left lane change.

FIG. 3D depicts a graph 330 illustrating a first gaze model 335A associated with a right lane change, a second gaze model 335B associated with a left lane change, and a third gaze model 335C associated with staying in the same lane. The gaze dynamics of the driver 150 may be compared to a plurality of gaze models associated with different maneuvers including, for example, the first gaze model 335A associated with a right lane change, the second gaze model 335B associated with a left lane change, the third gaze model 335C associated with staying in the same lane, and/or the like. As shown in FIG. 3D, the driver state engine 360 may determine that the driver 150 is about to perform a right lane change if the gaze dynamics of the driver 150 corresponds to the first gaze model 335A associated with a right lane change.

Table 1 below depicts the precision and recall associated with the future action (e.g., left lane change, right lane change, and/or the like) predicted by the driver state engine 360 based on the gaze dynamics of the driver 150.

| Time before maneuver | | Left Lane Change Prediciton | | Right Lane Change Prediciton | |
| --- | --- | --- | --- | --- | --- |
| Frame | Milliseconds | Precision | Recall | Precision | Recall |
| 60 | 2000 | 0.4357 | 0.6931 | 0.6098 | 0.7978 |
| 54 | 1800 | 0.4605 | 0.7954 | 0.6066 | 0.7872 |
| 48 | 1600 | 0.4740 | 0.8295 | 0.6250 | 0.8510 |
| 42 | 1400 | 0.4780 | 0.8636 | 0.6279 | 0.8617 |
| 36 | 1200 | 0.4810 | 0.8636 | 0.6391 | 0.9042 |
| 30 | 1000 | 0.4873 | 0.8750 | 0.6391 | 0.9042 |
| 24 | 800 | 0.4906 | 0.8863 | 0.6391 | 0.9042 |
| 18 | 600 | 0.4969 | 0.9090 | 0.6418 | 0.9148 |
| 12 | 400 | 0.4815 | 0.8863 | 0.6364 | 0.8936 |
| 6 | 200 | 0.4780 | 0.8636 | 0.6391 | 0.9042 |
| 0 | 0 | 0.4753 | 0.8750 | 0.6279 | 0.8617 |

Figure 4:
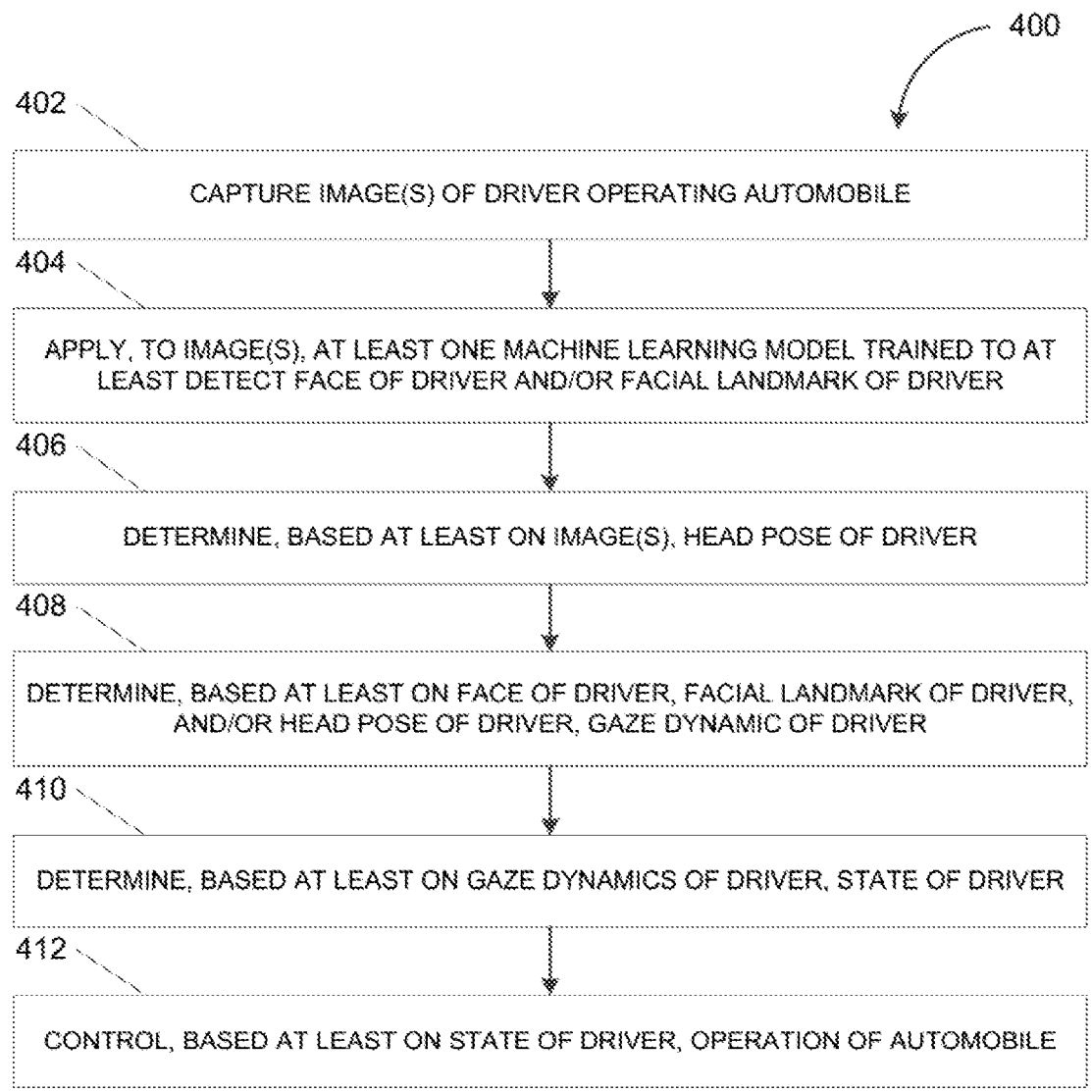
FIG. 4 depicts a flowchart illustrating a process for machine learning based driver assistance, in accordance with some example embodiments.

FIG. 4 depicts a flowchart illustrating a process 400 for machine learning based driver assistance, in accordance with some example embodiments. Referring to FIGS. 1-2, 3A-D, and 4, the process 400 may be performed by the driver assistance system 100.

At 402, the driver assistance system 100 may capture one or more images of the driver 150 operating the automobile 140. In some example embodiments, the driver assistance system 100 may the plurality of sensors 110. As noted, the plurality of sensors 110 may include the one or more cameras 115B, which may be any type of light-based sensor including, for example, a video camera, a still camera, an infrared camera, and/or the like. The one or cameras 115B may, while the driver 150 is operating the automobile 140, capture one or more images of the driver 150 including, for example, the image 210.

At 404, the driver assistance system 100 may apply, to the one or more images, at least one machine learning model trained to at least detect a face of the driver 150 and/or a facial landmark of the driver 150. For example, the driver assistance system 110 may include the face detector 220. The face detector 220 may include the first machine learning model 225, which may be trained (e.g., based on an augmented set of training data) to detect a face in the image 210 captured by the one or more cameras 115B. As shown in FIG. 2, the face detector 220 may provide the first output 280A, which may include a visual indication (e.g., box, heat map, and/or the like) of the location of the face of the driver 150 in the image 210. Alternatively and/or additionally, the driver assistance system 100 may include the landmark localizer 230. The landmark localizer 230 may include the second machine learning model 235, which may be trained (e.g., based on an augmented set of training data) to detect one or more facial landmarks in the image 210 including, for example, an iris, a pupil, an eyelid, and/or the like. Moreover, the landmark localizer 230 may provide the second output 280B, which may include visual indications (e.g., dots, heat map, and/or the like) of the locations of the facial landmarks of the driver 150 in the image 210.

At 406, the driver assistance system 100 may determine, based at least on the one or more images, a head pose of the driver 150. In some example embodiments, the driver assistance system 100 may include the head pose estimator 240, which may be configured to determine the head pose of the driver 150. As noted, the head pose of the driver 150 may refer to the position and/or orientation of the head of the driver 150 in the image 210 including, for example, the pitch, the yaw, and/or the roll of the head of the driver 150. According to some example embodiments, the head pose estimator 240 may apply any technique (e.g., active appearance models (AAMs), a pose from orthography and scaling with iterations (POSIT), and/or the like) to determine the head pose of the driver 150.

At 408, the driver assistance system 100 may determine, based at least on the face of the driver 150, the facial landmark of the driver 150, and/or the head pose of the driver 150, a gaze dynamics of the driver 150. In some example embodiments, the driver assistance system 100 may include the driver state engine 260, which may be configured to determine the gaze zone of the driver 150 as well as changes in the gaze zone of the driver 150 during the operation of the automobile 140. As noted, the gaze zone of the driver 150 may be one of a plurality of areas the driver 150 may look towards while operating the automobile 140 (e.g., far left, left side mirror, front, instrument cluster, rear view mirror, center console, right, right side mirror, and/or the like). Meanwhile, the gaze dynamics of the driver 150 may refer to the changes in the gaze zone of the driver 150.

At 410, the driver assistance system 100 may determine, based at least on the gaze dynamics of the driver 150, a state of the driver 150. For example, the driver state 270 of the driver 150 may include a prediction of an action (e.g., left lane change, right lane change, stay in same lane, and/or the like) that the driver 150 is about to perform. Thus, in some example embodiments, the driver state engine 260 may determine the driver state 270 by at least comparing the gaze dynamics of the driver 150 to one or more gaze models associated with different maneuvers (e.g., left lane change, right lane change, stay in same lane, and/or the like). The gaze model of a maneuver may, as noted, include a distribution (e.g., Gaussian distribution and/or the like) of the different gaze zones observed in drivers executing the maneuver including for example, the gaze zones of the drivers before executing the maneuver, the gaze zones of the drivers while executing the maneuver, the gaze zones of the drivers after executing the maneuver, and/or the like. As FIGS. 3C-D shows, the driver state engine 260 may determine the driver state 270 of the driver 150 may be a certain maneuver if the gaze dynamics of the driver 150 corresponds to the gaze model of that maneuver.

At 412, the driver assistance system 100 may control, based at least on the driver state 270 of the driver 150, an operation of the automobile 140. For example, in some example embodiments, the driver state 270 may be that the driver 150 is inattentive and/or not alert (e.g., eyes down, eyes closed, and/or the like). As such, the driver assistance system 110, for example, the controller 130, may provide an alert and/or assume control over the operation of the automobile 140 from the driver 150. Alternatively and/or additionally, the driver state 270 may be a future action of the driver 150 (e.g., left lane change, right lane change, and/or the like). Here, the controller 130 may maneuver the automobile 140 in a manner that anticipates and/or prepares for the future action. For instance, the controller 130 may, in anticipation of and/or in preparation for a lane change by the driver 150, maneuver the automobile 140 to avoid other automobiles in the desired lane.

Figure 5:
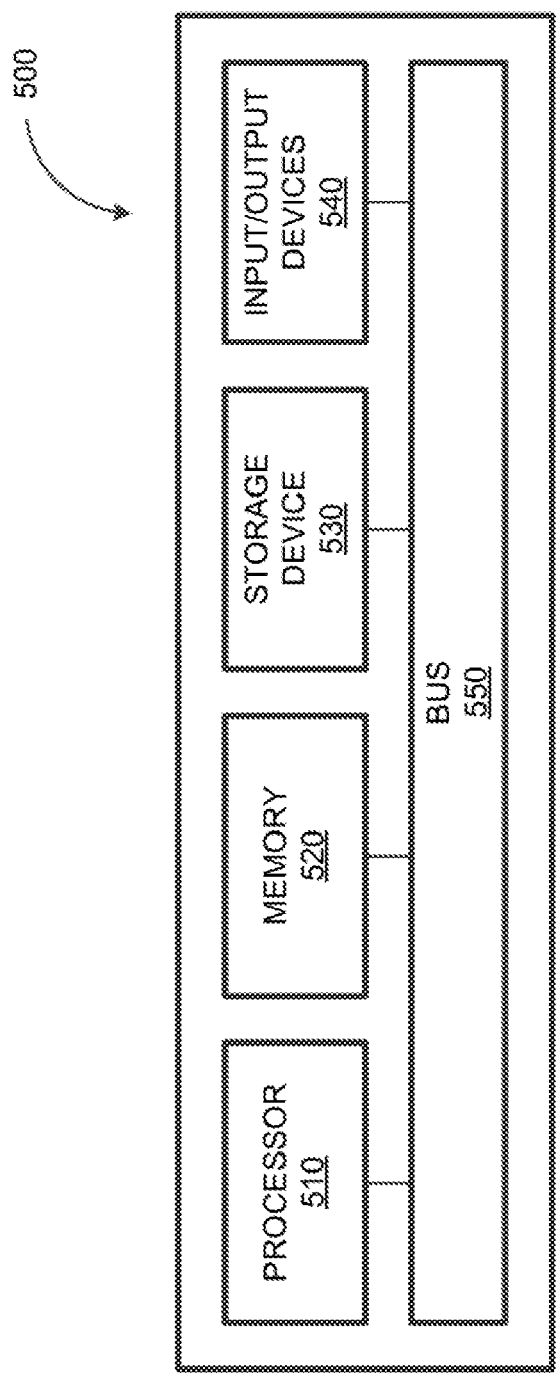
FIG. 5 depicts a block diagram illustrating a computing system, in accordance with some example embodiments.

FIG. 5 depicts a block diagram illustrating a computing system 500, in accordance with some example embodiments. Referring to FIGS. 1 and 5, the computing system 500 can be used to implement the driver assistance system 100 and/or any components therein.

As shown in FIG. 5, the computing system 500 can include a processor 510, a memory 520, a storage device 530, and input/output devices 540. The processor 510, the memory 520, the storage device 530, and the input/output devices 540 can be interconnected via a system bus 550. The processor 510 is capable of processing instructions for execution within the computing system 500. Such executed instructions can implement one or more components of, for example, the driver assistance system 100. In some example embodiments, the processor 510 can be a single-threaded processor. Alternately, the processor 510 can be a multi-threaded processor. The processor 510 is capable of processing instructions stored in the memory 520 and/or on the storage device 530 to display graphical information for a user interface provided via the input/output device 540.

The memory 520 is a computer readable medium such as volatile or non-volatile that stores information within the computing system 500. The memory 520 can store data structures representing configuration object databases, for example. The storage device 530 is capable of providing persistent storage for the computing system 500. The storage device 530 can be a floppy disk device, a hard disk device, an optical disk device, or a tape device, or other suitable persistent storage means. The input/output device 540 provides input/output operations for the computing system 500. In some example embodiments, the input/output device 540 includes a keyboard and/or pointing device. In various implementations, the input/output device 540 includes a display unit for displaying graphical user interfaces.

According to some example embodiments, the input/output device 540 can provide input/output operations for a network device. For example, the input/output device 540 can include Ethernet ports or other networking ports to communicate with one or more wired and/or wireless networks (e.g., a local area network (LAN), a wide area network (WAN), the Internet).

In some example embodiments, the computing system 500 can be used to execute various interactive computer software applications that can be used for organization, analysis and/or storage of data in various formats. Alternatively, the computing system 500 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities (e.g., SAP Integrated Business Planning as an add-in for a spreadsheet and/or other type of program) or can be standalone computing products and/or functionalities. Upon activation within the applications, the functionalities can be used to generate the user interface provided via the input/output device 540. The user interface can be generated and presented to a user by the computing system 500 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A system, comprising:
   at least data processor; and
   at least one memory storing instructions which, when executed by the at least one data processor, result in operations comprising:
   detecting, in one or more images of a driver operating an automobile, one or more facial landmarks, the detection of the one or more facial landmarks comprising applying, to the one or more images, a first machine learning model;
   determining, based at least on the one or more facial landmarks, a gaze dynamics of the driver, the gaze dynamics of the driver comprising a change in a gaze zone of the driver from a first gaze zone to a second gaze zone;
   determining, based at least on the gaze dynamics of the driver, a state of the driver regarding a prediction of a maneuver comprising a first lane change maneuver and/or a second lane change maneuver, wherein the determination of the state of the driver further comprises comparing the gaze dynamics of the driver to a first gaze model to predict the right lane change maneuver and/or to a second gaze model to predict the left change lane maneuver; and
   controlling, based at least on the determined state of the driver, an operation of the automobile.

2. The system of claim 1, wherein the one or more facial landmarks includes a pupil, an iris, and/or an eyelid.

3. The system of claim 1, further comprising:
   training, based at least on training data, the first machine learning model, the training data including a plurality of images that includes and/or excludes the one or more facial landmarks, and the first machine learning model being trained to detect the one or more facial landmarks in the plurality of images.

4. The system of claim 1, further comprising:
   detecting, in the one or more images of the driver operating the automobile, a face, the detection of the face comprising applying, to the one or more images, a second machine learning model.

5. The system of claim 4, further comprising:
   training, based at least on training data, the second machine learning model, the training data including a plurality of images that includes and/or excludes the face, and the second machine learning model being trained to detect the face in the plurality of images.

6. The system of claim 1, wherein the first gaze zone and/or the second gaze zone comprises different areas at which the driver looks while operating the automobile.

7. The system of claim 1 wherein the first gaze zone and/or the second gaze zone corresponds to a left side mirror of the automobile, a right side mirror of the automobile, a rear view mirror of the automobile, an instrument cluster of the automobile, a center console of the automobile, a first portion of a windshield directly in front of the driver, a second portion of the windshield to a right of the driver, and/or a driver side window.

8. The system of claim 1, wherein the state of the driver regarding the prediction of the maneuver further comprises a staying in lane maneuver, wherein the determination of the state of the driver further comprises comparing the gaze dynamics of the driver to a third gaze model to predict the staying in lane change maneuver.

9. The system of claim 8, wherein the first gaze model, the second gaze mode, and the third gaze model each comprises a Gaussian distribution of the gaze zones observed in drivers performing the maneuver.

10. The system of claim 8, wherein the first gaze model, the second gaze mode, and the third gaze model each comprises gaze zones observed in drivers before an execution of the maneuver, during the execution of the maneuver, and/or after the execution of the maneuver.

11. The system of claim 1, wherein the first gaze zone and/or the second gaze zone corresponds to one or more eyes of the driver being closed and/or cast downward, and wherein the state of the driver comprises that the driver is inattentive.

12. The system of claim 1, wherein the first machine learning model comprises a neural network, a regression model, an instance-based model, a regularization model, a decision tree, a Bayesian model, a clustering model, an associative model, a deep learning model, a dimensionality reduction model, and/or an ensemble model.

13. The system of claim 1, wherein the first machine learning model is configured to output a heat map comprising a first location having a first color and a second location having a second color, wherein the first location and the second location comprises different portions of the one or more images, wherein the first color corresponds to a first probability of the one or more facial landmarks being present at the first location, and wherein the second color corresponds to a second probability of the one or more facial landmarks being present at the second location.

14. The system of claim 1, wherein the control of the operation of the automobile comprises steering, acceleration, deceleration, and/or braking.

15. The system of claim 1, further comprising:
determining, based at least on the one or more images of the driver, a head pose of the driver, the head pose of the driver comprising a position and/or an orientation of a head of the driver, and the gaze dynamics of the driver further being determined based at least on the head pose of the driver.

16. The system of claim 1,
identify, from the one or more images of the driver, that a first facial landmark is occluded in a first image, and
in response to the occluded portion of first facial landmark being exceeding a threshold value, rejecting the first image to inhibit use of the first image to determine the state of the driver.

17. A computer-implemented method, comprising:
detecting, in one or more images of a driver operating an automobile, one or more facial landmarks, the detection of the one or more facial landmarks comprising applying, to the one or more images, a first machine learning model;
determining, based at least on the one or more facial landmarks, a gaze dynamics of the driver, the gaze dynamics of the driver comprising a change in a gaze zone of the driver from a first gaze zone to a second gaze zone;
determining, based at least on the gaze dynamics of the driver, a state of the driver regarding a prediction of a maneuver comprising a first lane change maneuver and/or a second lane change maneuver, wherein the determination of the state of the driver further comprises comparing the gaze dynamics of the driver to a first gaze model to predict the right lane change maneuver and/or to a second gaze model to predict the left change lane maneuver; and
controlling, based at least on the determined state of the driver, an operation of the automobile.

18. The method of claim 17, wherein the one or more facial landmarks includes a pupil, an iris, and/or an eyelid.

19. The method of claim 17, further comprising:
training, based at least on training data, the first machine learning model, the training data including a plurality of images that includes and/or excludes the one or more facial landmarks, and the first machine learning model being trained to detect the one or more facial landmarks in the plurality of images.

20. The method of claim 17, further comprising:
detecting, in the one or more images of the driver operating the automobile, a face, the detection of the face comprising applying, to the one or more images, a second machine learning model.

* * * * *